(12) United States Patent
Radivojevic et al.

(10) Patent No.: US 11,287,539 B2
(45) Date of Patent: Mar. 29, 2022

(54) APPARATUS FOR SENSING RADIATION

(71) Applicant: Nokia Technologies Oy, Espoo (FI)

(72) Inventors: Zoran Radivojevic, Cambridge (GB);
Matteo Bruna, Cambridge (GB)

(73) Assignee: Nokia Technologies Oy, Espoo (FI)

( * ) Notice: Subject to any disclaimer, the term of this patent is extended or adjusted under 35 U.S.C. 154(b) by 157 days.

(21) Appl. No.: 16/092,512

(22) PCT Filed: Mar. 14, 2017

(86) PCT No.: PCT/FI2017/050165
§ 371 (c)(1),
(2) Date: Oct. 10, 2018

(87) PCT Pub. No.: WO2017/178693
PCT Pub. Date: Oct. 19, 2017

(65) Prior Publication Data
US 2019/0162866 A1    May 30, 2019

(30) Foreign Application Priority Data

Apr. 13, 2016  (EP) ................................... 16165169
Dec. 23, 2016  (EP) ................................... 16206847

(51) Int. Cl.
*G01T 1/24*    (2006.01)
*G01T 1/26*    (2006.01)

(52) U.S. Cl.
CPC .............. *G01T 1/241* (2013.01); *G01T 1/247* (2013.01); *G01T 1/26* (2013.01)

(58) Field of Classification Search
CPC ........... G01T 1/241; G01T 1/247; G01T 1/26; H01L 29/1606; H01L 29/2003;
(Continued)

(56) References Cited

U.S. PATENT DOCUMENTS 5,652,430 A  *  7/1997  Lee ...................... H01L 27/146
                                                    250/370.09
6,002,134 A  *  12/1999  Lingren ............ H01L 27/14659
                                                    250/370.01
(Continued)

FOREIGN PATENT DOCUMENTS

| CN | 104062676 A | 9/2014 |
|---|---|---|
| EP | 2 876 465 A1 | 5/2015 |
| WO | WO 2015/107777 A1 | 7/2015 |

OTHER PUBLICATIONS

Klekachev, Alexander, et al., "Graphene Transistors and Photodetectors", The Electrochemical Society *Interface*, Jan. 1, 2013, vol. 22, No. 1, 6 pgs.

(Continued)

*Primary Examiner* — Dani Fox
*Assistant Examiner* — Soorena Kefayati
(74) *Attorney, Agent, or Firm* — Harrington & Smith

(57) ABSTRACT

An apparatus for sensing radiation is provided. Certain examples provide an apparatus including: a first layer including a sensor, wherein the sensor is configured to be responsive to changes in an electric field in the vicinity of the sensor; a second layer including a substrate configured to produce charge carriers in response to incident radiation; and a third layer including a plurality of electrodes, wherein the plurality of electrodes are configured to be selectively addressed during a readout operation of the sensor. Certain examples, relate to an apparatus for sensing X-rays or sensing neutrons including a graphene field effect transistor.

21 Claims, 4 Drawing Sheets

(58) Field of Classification Search
CPC ......... H01L 29/42384; H01L 21/02389; H01L 21/02458; H01L 21/0254; H01L 31/115
See application file for complete search history.

(56) References Cited

U.S. PATENT DOCUMENTS

| | | | | |
|---|---|---|---|---|
| 6,727,504 | B1* | 4/2004 | Doty | G01T 3/008 250/390.01 |
| 7,745,800 | B1* | 6/2010 | McGinnis | G01T 1/00 250/390.01 |
| 8,981,346 | B1* | 3/2015 | Kamin | H01L 31/085 257/29 |
| 9,508,885 | B1* | 11/2016 | Li | H01L 31/028 |
| 9,972,649 | B2* | 5/2018 | Spanoudaki | H01L 29/0669 |
| 10,705,228 | B2* | 7/2020 | Reese | H01L 51/0045 |
| 2002/0079456 | A1* | 6/2002 | Lingren | G01T 1/241 250/370.01 |
| 2002/0195566 | A1* | 12/2002 | Rodricks | G01T 1/2985 250/370.09 |
| 2004/0256569 | A1* | 12/2004 | Tokuda | H01L 27/14676 250/370.13 |
| 2005/0205798 | A1* | 9/2005 | Downing | G01T 3/008 250/390.11 |
| 2006/0049362 | A1* | 3/2006 | Friedman | C22C 19/05 250/374 |
| 2007/0096032 | A1* | 5/2007 | Yagi | G01T 1/247 250/370.11 |
| 2008/0099869 | A1* | 5/2008 | Izumi | H01L 27/14632 257/443 |
| 2008/0210878 | A1* | 9/2008 | Friedman | G01J 1/42 250/374 |
| 2009/0184251 | A1* | 7/2009 | Karim | G01T 1/241 250/370.01 |
| 2011/0024635 | A1* | 2/2011 | Shah | C01F 17/271 250/362 |
| 2011/0210262 | A1* | 9/2011 | Prendergast | G01T 1/247 250/394 |
| 2012/0068078 | A1* | 3/2012 | Zhang | H01L 27/14609 250/370.08 |
| 2012/0074332 | A1* | 3/2012 | Watanabe | G01T 1/247 250/394 |
| 2012/0080607 | A1* | 4/2012 | Karim | H01L 31/119 250/370.13 |
| 2013/0048339 | A1* | 2/2013 | Tour | H01L 31/022491 174/126.1 |
| 2013/0256541 | A1* | 10/2013 | Engel | H01L 27/14676 250/370.01 |
| 2014/0117246 | A1* | 5/2014 | Zhou | G01T 1/185 250/375 |
| 2015/0234059 | A1* | 8/2015 | Roessl | G01T 1/247 378/5 |
| 2015/0253437 | A1* | 9/2015 | Goderer | G01T 7/005 378/207 |
| 2015/0301199 | A1* | 10/2015 | Nellissen | G01T 1/24 378/5 |
| 2015/0369928 | A1* | 12/2015 | Reese | H01L 51/0045 250/362 |
| 2016/0124096 | A1* | 5/2016 | Carini | G01T 1/2928 250/370.06 |
| 2016/0284811 | A1* | 9/2016 | Yu | H01L 29/786 |
| 2016/0313458 | A1* | 10/2016 | Masuda | H01L 27/14612 |
| 2017/0108598 | A1* | 4/2017 | Friedman | H01C 7/006 |
| 2017/0115405 | A1* | 4/2017 | Biele | G01T 1/24 |
| 2017/0117312 | A1* | 4/2017 | Spanoudaki | H01L 27/14636 |
| 2017/0146671 | A1* | 5/2017 | Shigeta | G21K 4/00 |
| 2017/0168168 | A1* | 6/2017 | Kuvvetli | G01T 1/161 |
| 2017/0184734 | A1* | 6/2017 | Picciotto | H01L 31/115 |
| 2018/0180747 | A1* | 6/2018 | Matsuura | G01T 1/24 |
| 2018/0277608 | A1* | 9/2018 | Lifka | G01T 1/241 |
| 2018/0356541 | A1* | 12/2018 | Steadman Booker | G01T 1/243 |

OTHER PUBLICATIONS

Bonaccorso, F. et al., "Graphene Photonics and Optoelectronics", Nature Photonics, University of Cambridge, Aug. 31, 2010, vol. 4, No. 9, 15 pgs.

* cited by examiner

APPARATUS FOR SENSING RADIATION

This patent application is a U.S. National Stage application of International Patent Application Number PCT/FI2017/050165 filed Mar. 14, 2017, which is hereby incorporated by reference in its entirety, and claims priority to EP application 16165169.0 filed Apr. 13, 2016 and EP application 16206847.2 filed Dec. 23, 2016,

TECHNOLOGICAL FIELD

Examples of the present disclosure relate to an apparatus for sensing radiation. Some examples, though without prejudice to the foregoing, relate to an apparatus for sensing ionizing radiation comprising a graphene field effect transistor (GFET).

BACKGROUND

Apparatuses for sensing radiation have a wide range of uses, for example in medical detection and imaging systems. Conventional radiation detection devices are not always optimal. It is useful to provide an improved radiation sensing device which may provide improved efficiency and sensitivity as well as being cheaper and simpler to manufacture.

The listing or discussion of any prior-published document or any background in this specification should not necessarily be taken as an acknowledgement that the document or background is part of the state of the art or is common general knowledge. One or more aspects/examples of the present disclosure may or may not address one or more of the background issues.

BRIEF SUMMARY

According to various but not necessarily all examples of the disclosure there is provided an apparatus comprising:
   a first layer comprising a sensor, wherein the sensor is configured to be responsive to changes in an electric field in the vicinity of the sensor;
   a second layer comprising a substrate configured to produce one or more charge carriers in response to incident radiation; and
   a third layer comprising a plurality of electrodes, wherein the plurality of electrodes are configured to be selectively addressed during a readout operation of the sensor.

According to various but not necessarily all examples of the disclosure there is provided an apparatus comprising:
   a first layer comprising sensing means configured to be responsive to changes in an electric field;
   a second layer comprising means configured to produce one or more charge carriers in response to incident radiation; and
   a third layer comprising a plurality of selectively addressable means, wherein the plurality of selectively addressable means are configured to be selectively addressed during a readout operation of the sensing means.

According to various, but not necessarily all, examples of the disclosure, there are provided examples as claimed in the appended claims.

BRIEF DESCRIPTION OF THE DRAWINGS

For a better understanding of various examples of the present disclosure that are useful for understanding the detailed description and certain embodiments of the invention, reference will now be made by way of example only to the accompanying drawings in which.

Figure 1A:
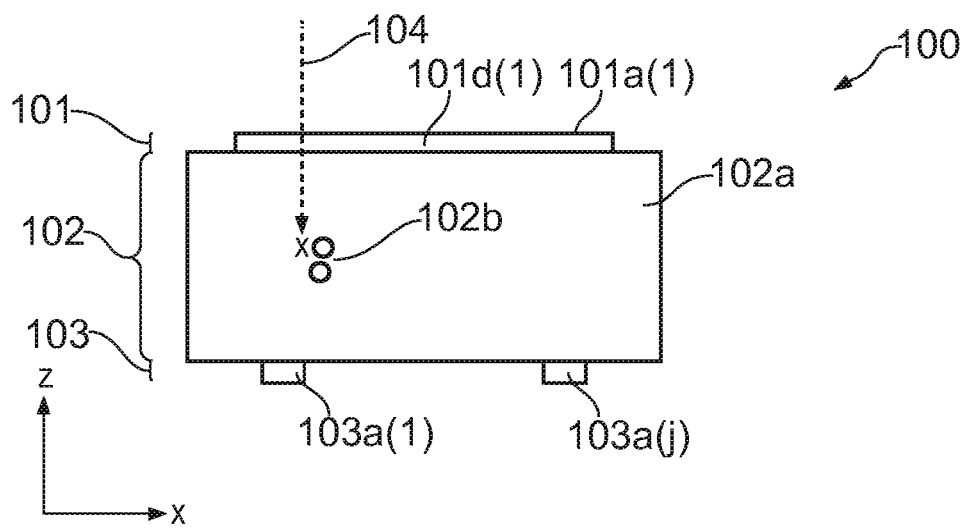
FIGS. 1A, 1B and 1C schematically illustrate a: side-on cross-sectional view, a plan view and a perspective view of an apparatus.

The Figures are not necessarily to scale. Certain features and views of the Figures may be shown schematically or exaggerated in scale in the interest of clarity and conciseness. For example, the dimensions of some elements in the Figures may be exaggerated relative to other elements to aid explication.

DETAILED DESCRIPTION

Examples of an apparatus for sensing radiation will now be described with reference to the Figures. The examples of the present disclosure and the accompanying claims may be suitably combined in any manner apparent to one of ordinary skill in the art. Similar reference numerals are used in the Figures to designate similar features. For clarity, all reference numerals are not necessarily displayed in all Figures.

The Figures consistently use a common Cartesian co-ordinate system comprising axes x, y, z where x ^y=z. The vector x defines a lengthwise direction, the vector y defines a transverse direction and the vector z defines a height (depth) direction.

Figure 1B:
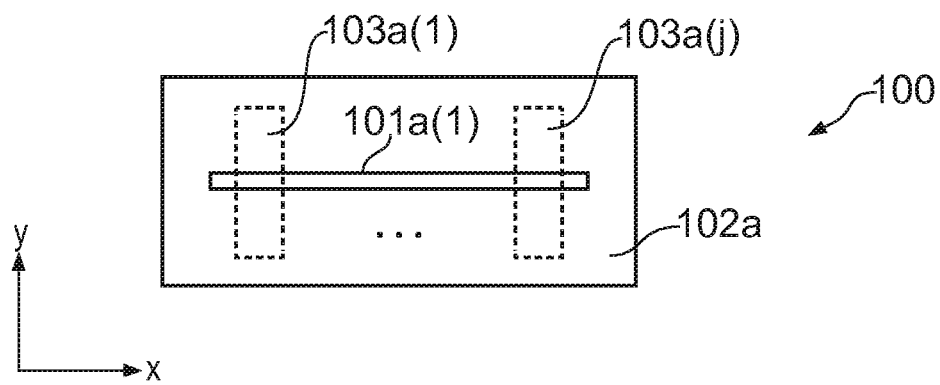
Figure 1C:
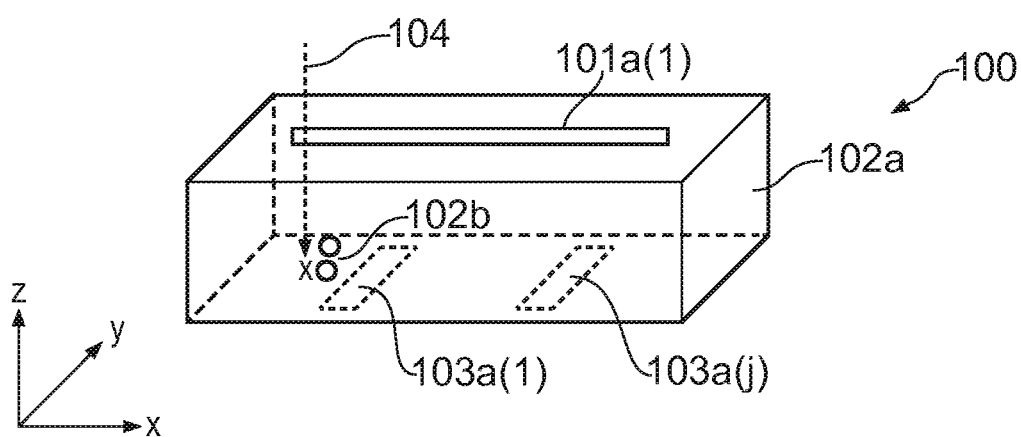

FIGS. 1A-1C schematically illustrates an apparatus 100 comprising:
   a first layer 101 comprising a sensor 101a(1), wherein the sensor is configured to be responsive to changes in an electric field in the vicinity of the sensor;
   a second layer 102 comprising a substrate 102a configured to produce charge carriers 102b in response to incident radiation 104; and
   a third layer 103 comprising a plurality of electrodes 103a(1)-103a(j), wherein the plurality of electrodes are configured to be selectively addressed during a readout operation of the sensor.

The component blocks of FIGS. 1A-1C are functional and the functions described may or may not be performed by a single physical entity.

The sensor 101a(1) may comprise one or more means, components or devices that are responsive to changes in an electric field in the vicinity of the sensor, i.e. sensitive to local electric field perturbations (such as those caused by the production of charge carriers 102b in the substrate 102a of the second layer 102 in response to incident radiation 104). The sensor 101a(1) may be elongate. The sensor 101a(1) may comprise a material configured to be responsive to changes in an electric field in the vicinity of the material 101d(1), for example such that a resistance of the material is dependent on a local electric field. The material 101d(1) may be a two-dimensional material, for example graphene. The sensor 101a(1) comprise a transistor, such as a field effect transistor. In certain examples, the sensor 101a(1) comprises a graphene field effect transistor (GFET). The sensor 101a(1) comprise an elongate strip of material 101d(1) provided between two electrodes (not illustrated), such electrodes being used to perform a readout operation of the elongate sensor 101a(1) to measure the sensor's response to perturbations in the local electric field.

The second layer 102 may be disposed between the first and third layers 101 and 103. The substrate 102a of the second layer 102 may be formed of any material offering high efficiency in capturing radiation and producing charge carriers 102b, such as free electron-hole pairs.

The substrate 102a of the second layer 102 may be formed of material configured for both efficiency at conversion of radiation to charge carriers and mobility of the created charge carriers.

The substrate 102a may be formed of a semiconductor material having high atomic number (Z). The third layer 103 and the substrate 102a may be provided with a thickness (height/depth in z direction) of the order of, for example, 0.1, 0.5, 1, 3, 5 and 10 mm. The substrate 102a may be formed of materials with higher minority charge carrier diffusion length (e.g. greater than 1 μm at room temperature without external electric fields).

The plurality of electrodes/selectively addressable means 103a(1)-103a(j) may be configured to generate an electric field which causes one or more of the charge carriers 102b of the substrate 102a to drift towards the electrode 103a(1)-103a(j) and oppositely charged charge carriers 102b to drift towards the sensor 101a (1) (thereby altering the electric field in the vicinity of the sensor 101a (1), which the sensor 101a (1) is able to detect). The plurality of electrodes 103a(1)-103a(j), or means for generating such an electric field, may be disposed running parallel in a plane underneath the substrate/second layer 102a. The plurality of electrodes 103a(1)-103a(j) may be positioned such that they are transversely aligned with respect to the sensor 101a(1) e.g. they extend in the y-direction whereas the sensor 101a(1) extends in the x-direction. The electrodes 103a(1)-103a(j) may underlie the sensor 101a(1) so as to be laterally spaced apart along the length of the sensor 101a (1) lying (indirectly) beneath the sensor 101a(1).

Examples of the apparatus 100 are able to detect incident radiation by sensing a change in the electric field in the vicinity of the elongate sensor 101a(1) caused by the creation of charge carriers 102b in the substrate 102a in response to exposure to radiation. Such detection may be considered to correspond to 'direct' charge carrier production as compared to, for example, scintillator based detection where an intermediary conversion of the incident radiation to light occurs which is then itself detected.

Figure 2:
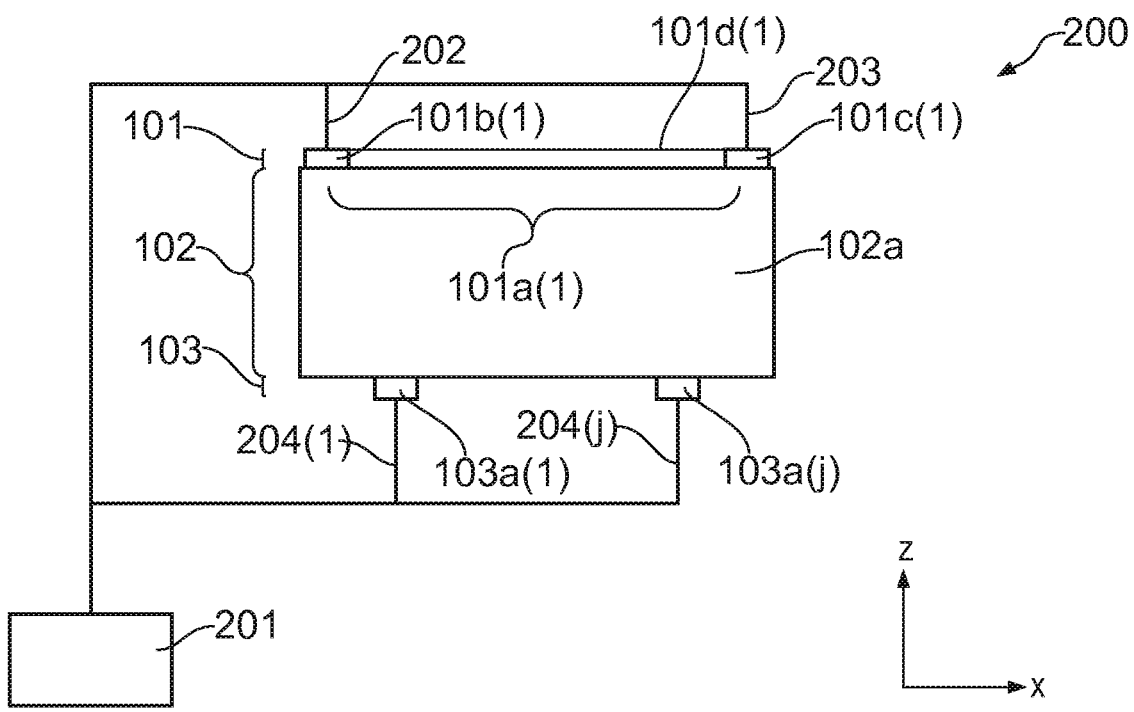
FIG. 2 schematically illustrates a further apparatus.

FIG. 2 shows an apparatus 200 similar to the apparatus 100 with the addition of circuitry 201 configured to monitor one or more parameters of one or more responses of the sensor 101a(1) whilst the plurality of electrodes 103a(1)-103a(j) are selectively addressed.

In the apparatus 200 of FIG. 2, the sensor 101a(1) comprises a first electrode 101b(1), a second electrode 101c(1) and a material 101d(1) provided interconnecting the first and second electrodes 101b(1) and 101c(1). The material 101d(1) is configured to be sensitive to electric fields. The sensor 101a(1) may be elongate—having a significantly greater dimension in the x-direction than the y-direction. In certain examples, the material 101d(1) may form a channel of a field effect transistor (FET). In certain examples, the first and second electrodes 101b(1), 101c(1) and the material 101d(1) form at least part of a GFET.

In certain examples, the first and second electrodes 101b(1), 101c(1) may be configured to provide source and drain electrodes. In some examples, the plurality of electrodes 103a(1)-103a(j) may be configured to provide a plurality of gate electrodes.

The circuitry 201 of FIG. 2 may comprise one or more of monitoring, control and readout circuitry. The parameters of the one or more responses of the elongate sensor 101a(1) may, in certain examples, correspond to an impedance, reactance or resistance of the sensor 101a(1). The circuitry 201 may monitor a voltage drop across the electrodes 101b(1)-101c(1) and/or current passing therebetween.

The circuitry 201 may be galvanically connected with the first and second electrodes 101b(1) and 101c(1) via control/readout lines 202 and 203. Furthermore, control/addressing lines 204(1)-204(j) may be provided to galvanically connect the circuitry 201 to the plurality of electrodes 103a(1)-103a (j). The circuitry 201 may be configured to control the readout operation of the elongate sensor 101a(1) whilst sequentially applying an input voltage to each of the plurality of electrodes 103a(1)-103a(j). The control circuitry may be configured to measure one or more responses of the elongate sensor 101a(1) upon the provision of an input to each of the plurality of electrodes.

For the purposes of illustration and not limitation, in some examples detection of radiation occurs via the sensor's sensitivity to local electric field perturbations caused by ionised charges generated in the adjacent substrate 102a. Where radiation is incident to the apparatus 200 proximal to a particular one of the plurality of electrodes 103a(1)-103a (j), when that particular electrode is addressed/applied with a voltage input during the reading out/measuring of a response of the sensor 101a(i), the applied voltage causes the created charge carriers 102b (electron-hole pairs) to separate and drift towards the particular electrode 103a(n) and the material 101d(m). This causes a perturbance in the electric field in the vicinity of the material 101d(m) which is sensed by the material 101d(m) and causes a response, such as affecting its impedance, reactance or resistance. The magnitude of the response when the particular electrode 103a(n) is addressed/applied with an input voltage is greater than the magnitude of the response when another of the plurality of electrodes 103a(1)-103a(j) (such as one less proximal to the site of the incident radiation) is addressed/applied with an input voltage. Thus, it is possible to distinguish between a response of the material 101d(m) from a particular one 103a(n) of the plurality of electrodes which is proximal to the site of incident radiation, as compared to the responses of others of the plurality of electrodes 103a(1)-103a(j). By measuring and determining responses of the material 101d(m) upon application of input voltages to each of the plurality of electrodes 103a(1)-103a(j), a determination can be made as to the electrode 103a(n) most proximal to the location of the incident radiation. By identifying the particular electrode 103a(n) most proximal to the site of incident radiation, a determination can then be made as to the location in the x-direction on the apparatus of the incident, thereby providing position sensitive detection of the radiation.

The control circuitry may be configured to:

identify one or more of the plurality of electrodes 103a(1)-103a(j) in dependence upon the one or more responses of the sensor 101a(m). For example, where an input is applied to one particular electrode 103a(n) that gives rise to a particular predetermined response (such as a response that crosses a predetermined threshold of measured resistance for example) this can be used to indicate that the radiation was incident to the apparatus 200 in the vicinity of that particular electrode 103a(n). The circuitry 201 may be configured to determine one or more longitudinal positions in the x-direction along the apparatus in dependence upon the identified particular electrode 103s(n) and thereby determine a location 'n' of the incident radiation 104 to the apparatus 200, in dependence at least partly upon at least the identified one or more plurality of electrodes 103a(1)-103a(j), so as to provide position sensitive detection of the incident radiation in at least one longitudinal direction (i.e. the x direction) of the apparatus 200. In such a manner, effectively, one-dimensional position sensitivity to incident radiation may be provided by the apparatus 200.

Figure 3:
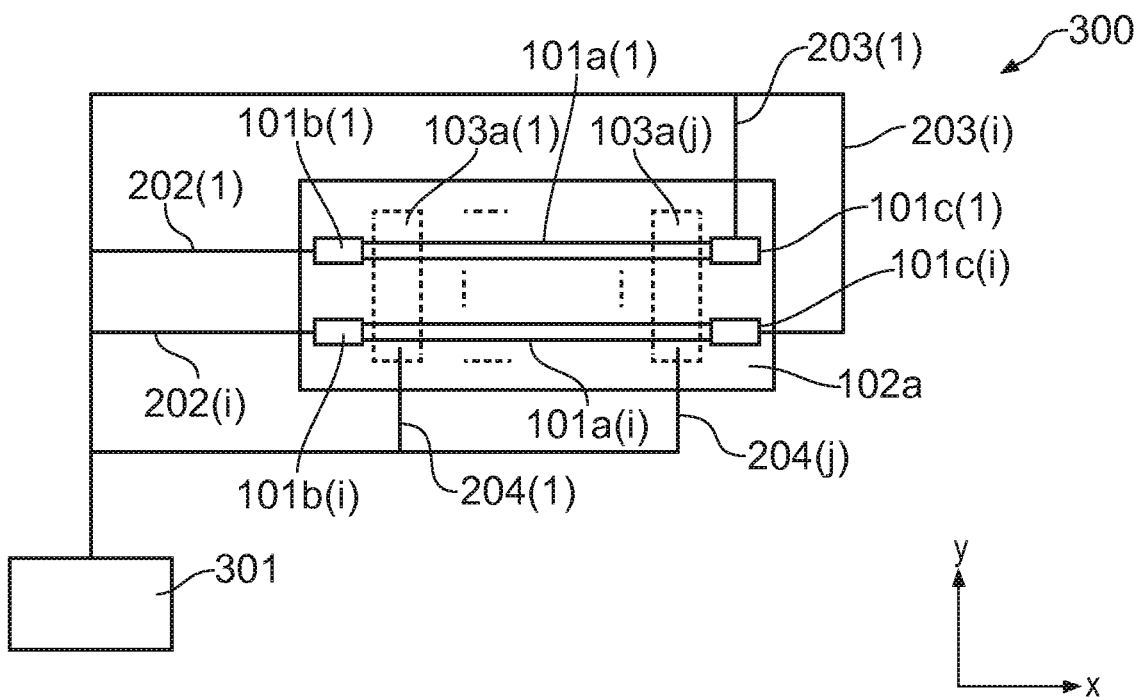
FIG. 3 schematically illustrates a yet further apparatus.

FIG. 3 illustrates a further apparatus 300 that is configured so as to additionally enable position sensitive detection of incident radiation in a transverse direction (i.e. y-direction) and which may therefore be used, in combination with the above-described position sensitivity in the longitudinal direction, to provide two-dimensional position sensitivity for the apparatus 300.

In the apparatus 300 of FIG. 3, the first layer 101 comprises a plurality of sensors 101a(1)-101a(i) which may be connected to the circuitry 301 via respective control/readout lines 202(1)-202(i) and 203(1)-203(i).

Each of the elongate sensors 101a (1)-101a(i) is configured to extend in a first direction, i.e. a longitudinal x-direction. Each of the plurality of electrodes 103a(1)-103a(j) of the third layer 103 is configured to extend in a second direction, substantially perpendicular to the first direction, i.e. a transverse y-direction. Each of the plurality of electrodes 103a(1)-103a(j) may themselves be elongate such that they extend beneath each of the plurality of sensors 101a(1)-101a(i) of the first layer 101. Such a configuration may provide a 'cross-bar' geometry sensor arrangement.

The plurality of sensors 101a(1)-101a(i) may be provided in a first arrangement, i.e. provided in a spaced apart, side-by side and parallel array. The plurality of electrodes 103a(1)-103a(j) may be provided in a second arrangement, which may be substantially perpendicular to the arrangement of the first array, e.g. a plurality of spaced apart, side-by-side elongate electrodes 103a(1)-103a(j) in parallel but perpendicular to the parallel elongate sensors 101a(1)-101a(i) of the first layer.

The circuitry 301 may be configured to monitor one or more parameters of the one or more responses of the plurality of elongate sensors 101a(1)-101a(i), for example the impedance, reactance or resistance of the sensors 101a(1)-101a(i). This may be achieved by measuring the voltage across and/or current passing through each respective first and second electrode pair, 101b(1) and 101c(1)-101b(i) and 101c(i), of each of the plurality of sensors, 101a(1)-(i).

The circuitry 301 may measure one or more responses of each of the plurality of elongate sensors 101a(1)-101a(i) and, using the same, may then:

identify one or more 101a(m) of the plurality of elongate sensors 101a(1)-101a(i) in dependence upon the measured one or more response; and determine one or more transverse positions 'm' along the apparatus 300 in dependence upon the identified one or more 101a(m) of the plurality of elongate sensors 101a(1)-101a(i); and/or determine one or more locations 'm' of radiation incident to the apparatus 300 in dependence at least partly upon the identified one or more 101a(m) of the plurality of elongate sensors 101a(1)-101a(i) so as to provide position sensitive detection of incident radiation in at least a transverse direction (y-direction) of the apparatus 300.

The ability to provide such position sensitive detection in a transverse direction (y-direction) of the apparatus 300 in combination with the ability to provide position sensitive detection of incident radiation 104 in a perpendicular longitudinal direction (x-direction) of the apparatus 300 may provide the ability to detect the position of incident radiation over a two-dimensional surface of the apparatus 300. Such two-dimensional positional detection of incident radiation creates a camera that enables an image of incident radiation to be captured.

It is to be appreciated that the position sensitivity/resolution in each of the x and y directions may be increased by increasing the density of the number of sensors 101a(1)-101a(i) and electrodes 103a(1)-103a(j), i.e. the number of sensors per unit length and number of the plurality of electrodes per unit length.

In the examples of FIGS. 1A-1C, 2 and 3, the sensors 101a(1))-101a(i) are elongate sensors extending across a whole of a sensing area in the longitudinal direction (x-direction) However, in other implementations each sensor 101a(y) the is sub-divided in the transverse direction (y-direction) into discrete sensors 101a(x, y) that are interconnected electrically to form the sensor 101a(y).

In the examples of FIGS. 1A-1C, 2 and 3, the electrodes 103a(1)-103a(j) are elongate electrodes extending across a whole of a sensing area in the transverse direction (y-direction). However, in other implementations each electrode 103a(x) is sub-divided in the longitudinal direction (x-direction) into discrete sensors 103a(x, y) that are interconnected electrically to form the sensor 103a(x).

In some examples the apparatus 100, 200, 300 may be for detecting and/or imaging ionizing radiation. Ionizing radiation is radiation that has enough energy to free electrons from atoms or molecules. Also it can be radiation which can cause nuclear reactions in the absorbing material generating energetic charged particles such as energetic protons and/or alpha particles.

Figure 4:
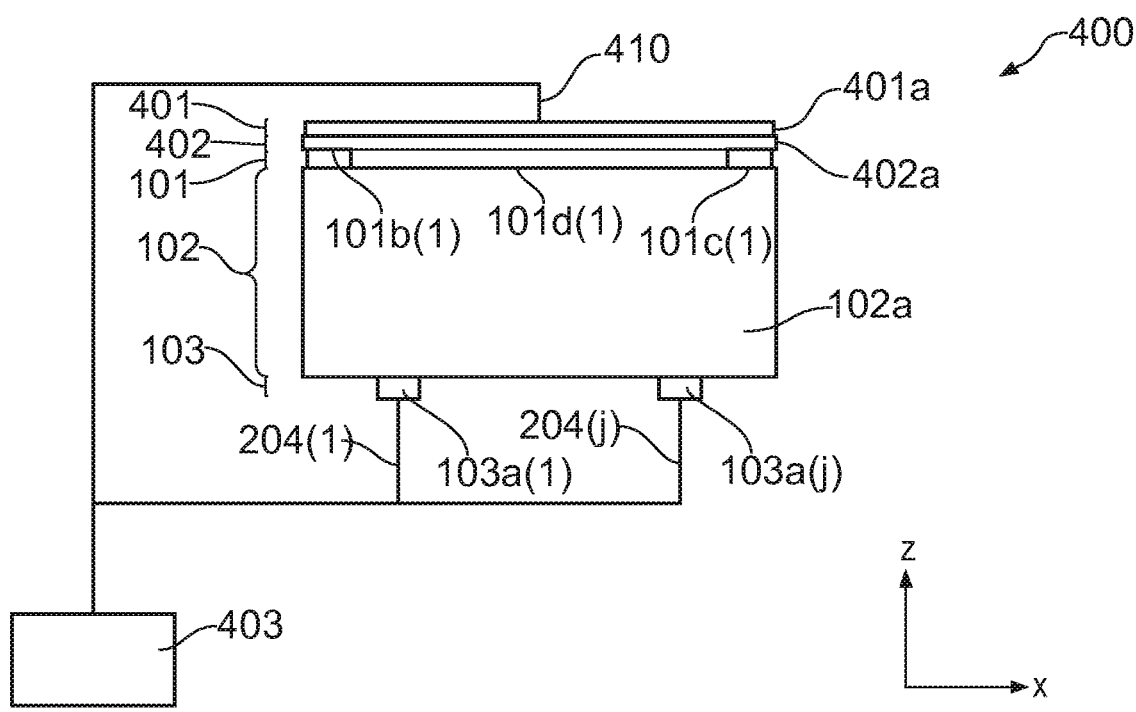
FIG. 4 schematically illustrates a yet further apparatus.

FIG. 4 shows a further apparatus 400 comprising an additional fourth layer 401 disposed above the first layer 101, wherein the fourth layer comprises a further electrode 401a. The further 'top' electrode may be spaced apart from the first layer 101 via an intermediary layer 402, such as a layer of a dielectric material 402a. The further electrode 401a may extend both in a longitudinal direction as well as a transverse direction so as to provide a substantially 2 dimensional planar electrode overlaying the one or more sensors 101a (1)-101a(i) of the first layer 101.

Control circuitry 403 may be used to provide a voltage to the further electrode 401a, via control line 410, for example providing a potential difference between the further electrode 401a and one or more of the electrodes 103a(1)-103a(j). A predetermined voltage may be applied so as to increase the drift/transport velocity of the charge carriers 102b in the substrate 102a. Increasing the transport/drift of the charge carriers 102b advantageously may improve the timing properties of the detector and increase its response time. This may broaden the possible fields of application of the apparatus 400 in medical imaging, i.e. enabling it to be used in radiography/static imaging, fluoroscopy and CT scanning, where a fast response time of a detector is required.

Furthermore, electrode 401a may additionally and/or alternatively be provided with a further voltage input for neutralising any trapped charges in the apparatus 400 so as to effectively provide a reset/clearance function for the apparatus 400. During operation of the apparatus 400, some charge carriers (not illustrated) may get trapped in the vicinity of various of the layers of the apparatus 400. The trapped charges may slow down the drift velocity and reduce the readout speed of the apparatus 400. To speed up operation and enable faster readout of the sensor's overall system (i.e. improve the apparatus' timing properties) the electrode 401a may operate as a "clearance" electrode by applying a voltage electric pulse to neutralise the trapped charges and make the apparatus ready for the next incident radiation detection event. Advantageously, such clearance/reset functionality may improve the sampling rate of the apparatus 400 and, again, broaden the possible applications of its use in areas where fast response times are required.

Although in this example, the electrode 401 is a top electrode, in other implementations it may be provided as a bottom electrode (with opposite polarity).

Figure 5A:
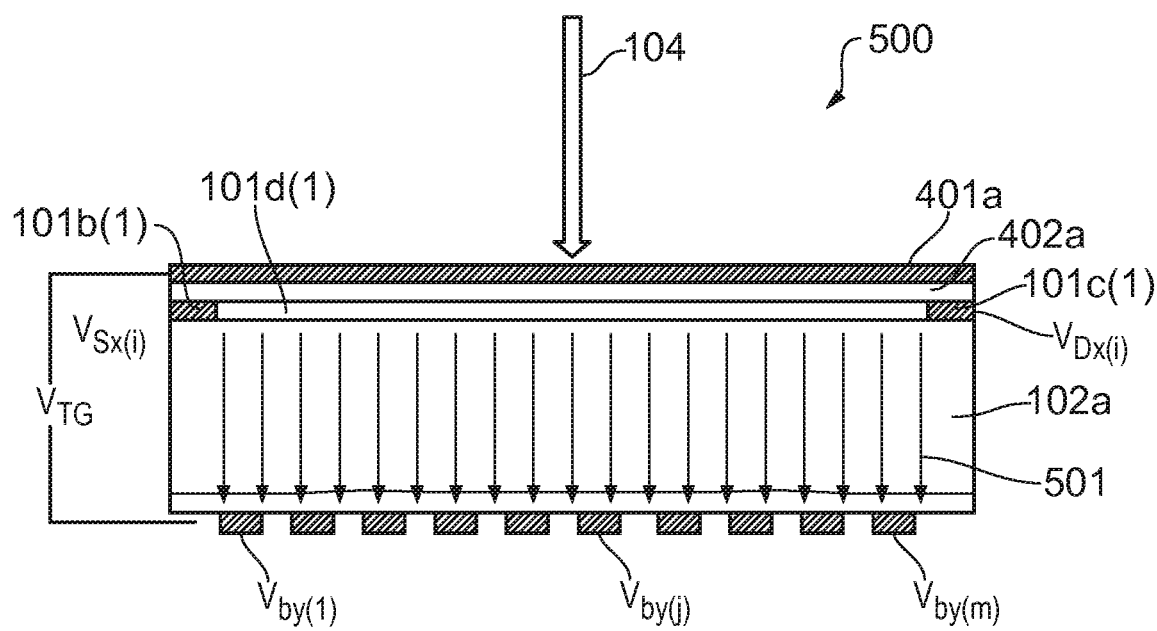
FIGS. 5A and 5B schematically illustrate a cross-sectional side view and a perspective view of a yet further apparatus.
Figure 5B:
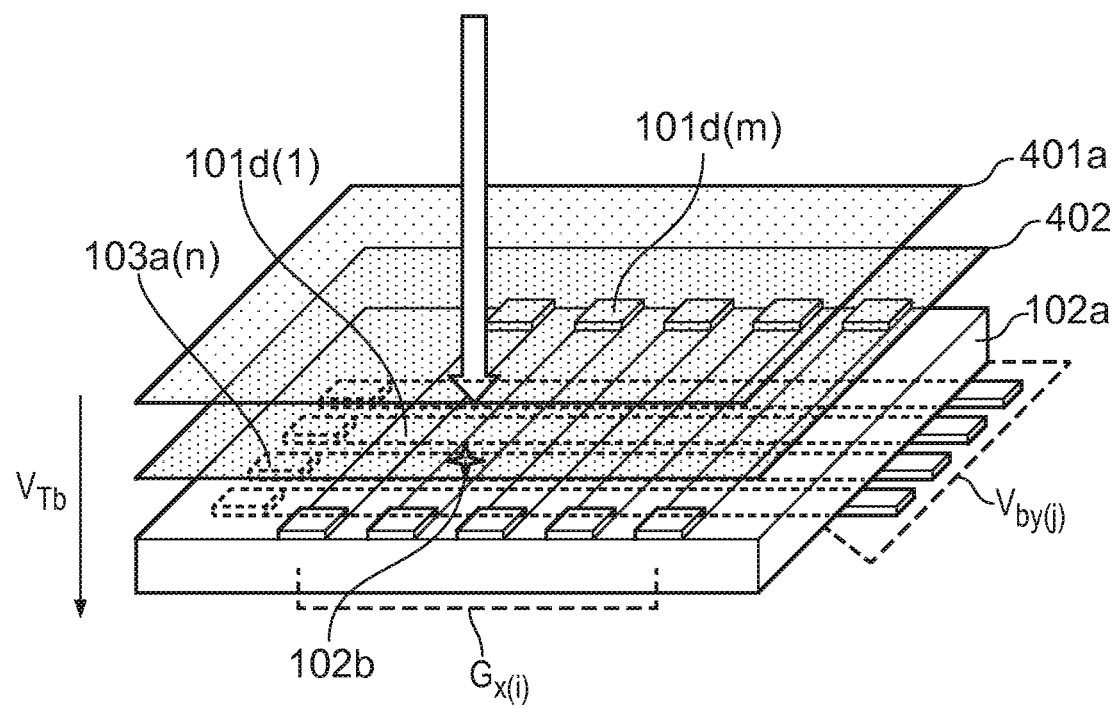

FIGS. 5A and 5B show a cross-sectional side view and a perspective view of a further apparatus 500. As with the previously described apparatuses 100, 200, 300 and 400, the apparatus 500 is based on a radiation detection mechanism that does not involve a scintillator and may directly produce charge carriers from incident radiation 104 without requiring an intermediary step of converting the radiation to light which is itself detected (which introduces losses in intrinsic efficiency as well as effecting the positioning accuracy and spatial resolution of the detected radiation). The apparatus 500 is configured for direct production of charge carriers from incident radiation 104. The charge carriers are detected using charge sensitive GFETs and the high sensitivity of graphene resistivity to local electric field perturbations caused by the charge carriers.

A plurality of GFET radiation sensors (GR) 101a(1)-101a(i) each configured as a field effect transistor (FET) are provided on a radiation absorbing substrate 102a. The radiation technique employed is based on measurement of the electric field changes in the vicinity of the graphene channel 101d(1)-101a(i) of the GFET due to ionisations in the substrate 102a caused by incident radiation 104.

The plurality of electrodes 103a(1)-103a(j) provide a plurality of back gate electrodes. A back gate voltage Vby(j) is sequentially applied across the plurality of back gate electrodes.

Also, source voltages VSx(i) and drain voltages VDx(i) are applied to the plurality of first electrodes 101b(1)-101b(n) and the plurality of second electrodes 101c(1)-101c(n) respectively, so as to drift charge carriers (electrons or holes) produced by the incident radiation 104 to the neighbourhood of the graphene channels 101d(1)-101d(i).

Graphene resistivity, which is highly sensitive to local electric field changes, is modified by the electric field perturbations caused by these charge carriers. Each GFET radiation sensor GR may provide detection as well as signal amplification jointly and may enable the sensing of radiation with high sensitivity, low noise and low power consumption at room temperature.

The apparatus 500 is made from a plurality of GFET transistors on a substrate 102a. The GFET transistors are provided with elongate graphene strips 101d placed parallel to a x-direction, wherein each strip 101d is terminated by a pair of electrodes, namely a first and second electrode 101b and 101c. Positional sensitivity in the y-direction is achieved by the position of each graphene strip 101d, i.e. the y-coordinate of the graphene strip. Positional sensitivity in a perpendicular x-direction (i.e. longitudinally along the length of the graphene strip) is provided by the gate electrodes 103a placed at the bottom of the substrate 102a aligned parallel to the y-direction and perpendicularly to x-direction.

Each GFET transistor is sequentially addressed by drain and source electrodes 101b(n), 101c(n) with respective gate-source voltages Vby-VSx.

Such an arrangement and architecture of gate electrodes 103a and graphene strips 101d form a crossbar readout system which enables the possibility for sequentially reading each localised interaction point (i.e. a point where radiation interacts with the substrate 102a so as to produce an electron-hole pair) across the two-dimensional coordinates, x-y, of the substrate 102a, thereby enabling localised detection of an incident radiation event in the substrate 102a. Such positional sensitivity may enable the creation of a camera that captures an image.

FIG. 5B illustrates a partially exploded perspective view of the apparatus 500 showing an upper electrode 401a, which, as discussed with regards to FIG. 4, may function as a drift electrode and/or reset/clearance electrode so as to increase the speed of drift of generated localised electron-hole pairs and also to enable the discharging of any trapped charges after a certain period of operation. A dielectric 402a is provided between the top electrode 401a and the layer comprising the source electrodes, graphene strips and drain electrodes.

The substrate 102a may have a thickness several orders or magnitude greater than the thickness of other layers and electrodes, and may be of the order of mm thick.

Lines 501 illustrate an electric field between the top electrode 401a and the bottom gate electrodes 103a.

As previously discussed, when incident radiation interacts with the thick substrate 102a, it generates an electron-hole (e-h) pair in a localised volume at position 502 (X, Y). To speed up and support transport (drift) of the e-h pairs towards the graphene strip electrode 101d, the top electrode 401a is provided at an upper surface of the detector. The top electrode 401a may be made of a thin film and may be deposited on an intermediary layer 410 comprising, for example, as thin dielectric substrate 410a (e.g. $Al_2O_3$ or HFO) so as to avoid galvanic contact between the graphene strips 101d(i) yet provide high electric field transmittance. When an electric potential VTG is applied between the top drift electrode 401a and the back gate electrode 103a, the electrons and holes are quickly drifted towards the graphene strips 101d and the back gate electrodes. In such a manner, the GFET sensors 101a(1)-101a(i) are influenced by localised e-h pairs via the drift towards the electrodes, thereby changing the conductivity and resistance of the graphene sensors 101a(1)-101a(i) which is detected and measured.

After a period of time, some charges may be trapped in the vicinity of the conductive layers of the apparatus 500. The trapped charges slow down the readout possibility of the detector. To speed up operation and enable fast readout of the overall system (i.e. improve timing properties) the top electrode 401a may additionally function as a "clearance" electrode by applying a short inverted voltage electric pulse (−VTG) to neutralise the trapped charges and make the system ready for the next radiation detection event. Such clearance/reset functionality may improve the rate of sampling the detector is able to carry out.

Once electron-hole pairs at a position 502 (X, Y) are formed, the charges are drifted towards the top electrode 401a and the bottom gate electrodes 103a by applying a voltage between the electrodes of VTG. The movement of the charges influences the electric field in the vicinity of the graphene strips of the GFET. The apparatus 500 may be read sequentially via the crossbar electrode perpendicularly placed at the top and bottom of the substrate 102a, namely the plurality of first and second electrodes 101b(i) and 101c(i) on the top of the substrate 102a and the plurality of electrodes 103a at the bottom of the substrate 102a. Coordinates of a particular radiation incident event are determined by proximity of the electron-hole pairs to the nearest crossing point of the perpendicular graphene channels 101d and bottom electrodes 103a. The sampling rate of the apparatus 500 may be improved by introducing clearance reset inverted pulses as discussed above (−VTG) at a certain frequency so as to neutralise any accumulated trapped charges in the vicinity of layers of the apparatus.

In some examples the apparatus 100, 200, 300, 400, 500 may be for detecting and/or imaging ionizing radiation. Ionizing radiation is radiation that has enough energy to free electrons from atoms or molecules or generate nuclear reactions producing energetic (particles with high kinetic energy in range of 0.1-2 MeV) protons and alpha particles According to the US Federal Communications Commission ionizing radiation is radiation that has an energy greater than 10 eV. According to the International Commission on Radiation Units and Measurements ionizing radiation is radiation that has an energy greater than 33 eV.

In some examples the apparatus 100, 200, 300 may be for detecting and/or imaging indirectly ionizing radiation. Indirectly ionizing radiation is radiation that, before incidence, does not comprise charged particles.

One example of indirectly ionizing radiation is electromagnetic (EM) radiation. For example, X-ray radiation. X-ray radiation is EM radiation produced outside the nucleus and typically has energy exceeding 120 eV. For example, medical applications may use a range of 10-200 keV.

For X-ray detection, the substrate 102a may be a semiconductor substrate. In some examples, the substrate 102a may be formed from undoped radiation absorbing substrates such as CdTe (Cadmium Telluride), SiC (Silicon Carbide) or GaAs (Galium Arsenide). Also solution-processed organic and inorganic semiconductors can be used. For example inexpensive methylammonium lead iodide perovskite (CH3NH3PbI3) which offers a combination of fast response and a high absorption cross section for X-rays, owing to the heavy lead (Pb) and iodine (I) atoms. In some examples, the substrate 102a may be formed from any material offering high efficiency in capturing X-rays and producing charge carriers. The substrate 102a may be formed of a material having high atomic number (Z). The most suitable semiconductors for this X-detection are ones which combines high-Z (atomic number) materials (because of high efficiency in capturing x-ray) without compromising the charge collection process. The materials listed above have sufficient carrier mobility and long free mean paths (diffusion length) of the minority charges induced by the captured x-rays. This enables relatively thicker substrates 102a to be used in the detector construction (0.1-2 mm) at the room temperatures. Substantially improved response in the X-ray detection can be achieved for devices with much thicker active layers (with absorption lengths in mm range). This provides for high intrinsic efficiency of the detector system.

The first and second electrode 101b and 101c may, for example, be made of Au. The top electrode 401a may be made of a thin metallic film (for example 100 nm Au for example, or transparent ITO) and may be deposited on an intermediary layer 410 comprising, for example, as thin dielectric substrate 410a (e.g. Al2O3 or HFO) so as to avoid galvanic contact between the graphene strips 101d(i) yet provide high electric field transmittance.

Another example of indirectly ionizing radiation is uncharged particles, for example, neutrons.

In case of neutron detection, the substrate 102a may be made of neutron sensitive material containing high abundancy of isotopes with high neutron capture cross section. Relatively high abundancy of such isotopes in the natural material provides substrates with high probability of neutron induced nuclear reactions generating energetic charge particles as a product. Such substrates are made of natural materials enriched with Boron 10 (10B), Lithium-7 (7Li) Gadolinium 157 (157Gd) or Uranium 238 (238U) isotopes.

The substrate 102a may, for example, be made from boron, for example boron nitride or boron carbide, lithium enriched with lithium-7 isotope, gadolinium enriched with gadolinium-157 isotope or uranium enriched with uranium-238. In some examples, the boron atoms may include an increased number of $B_{10}$ isotopes. In some examples, the boron nitride may be hexagonal boron nitride (hBN). The hBN may, for example, be used as a thin film or a pyrolytic plate, which may be quite thick e.g. >1 mm.

A thin-film (<10 μm thickness in z-direction) may be used as the substrate 102a. The incident neutrons produce ionization (via energetic charged protons or alpha particles) that may exit the substrate 102a resulting in a bulk charge displacement resulting in a resistance change for a sensor 101a as illustrated in FIGS. 1A-1C especially when the sensor 101a is formed of graphene. However, it would be desirable to provide a re-set electrode 401, for example on the bottom of the substrate 102a. GFETs used for neutron detection may have a size of less than 10 μm×10 μm arranged in a cross-bar architecture so that each can be selectively read. This may be achieved, for example, by controlling the gate electrodes on a row-by row basis and the source/drain read-out on a column by column basis, which allows the selective read-out of each GFET.

Neutron radiography is an imaging technique that provides images similar to X-ray radiography but with different details and structures. The attenuation of neutrons is for example element specific.

Boron containing drugs may be injected into the body and irradiated with neutrons to detect and trace the drug delivery and absorption on selected areas of the body based on the n-B interaction. Any of the apparatus may for example be used as a measurement device or probe.

Certain examples of the present disclosure may avoid the need for use of expensive amorphous silicon, amorphous selenium or a scintillator based detected system for the construction of X-ray flat panels and may provide a simplified apparatus for X-ray flat panels that employs a solution based material deposition technique, such as graphene and manipulation depositing technique may enable large X-ray detection over two-dimensional areas.

Furthermore, the efficiency of detecting may be increased as compared to previous scintillator based detection systems, thereby meaning a lower dosage of incident radiation may be required for medical imaging.

The application of the apparatus described includes medical imaging, medical measurement, airport security, explosive detection, material analysis, industrial scanning of, for example, lubricant movement etc.

In some examples the apparatus may be provided in the form of a device or module. Examples of the present disclosure provide both an apparatus comprising various elements, components, means or circuitry that provides the functionality for performing the above-described features. Various of the means or circuitry may be implemented as hardware, or may be implemented as software or firmware to be performed by a computer processor. In the case of firmware or software, examples of the present disclosure may involve a computer program product including a computer readable storage structure embodying computer program instructions (i.e. the software or firmware) thereon for performing by the computer processor.

As used in this application, the term 'circuitry' refers to all of the following:
(a) hardware-only circuit implementations (such as implementations in only analogue and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

Features described in the preceding description may be used in combinations other than the combinations explicitly described. Although functions have been described with reference to certain features, those functions may be performable by other features whether described or not. Although features have been described with reference to certain examples, those features may also be present in other examples whether described or not. Although various examples of the present disclosure have been described in the preceding paragraphs, it should be appreciated that modifications to the examples given can be made without departing from the scope of the invention as set out in the claims.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

As used herein, the "determining" (and grammatical variants thereof) can include: calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

In this description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some or all other examples. Thus 'example', 'for example' or 'may' refers to a particular instance in a class of examples. A property of the instance can be a property of only that instance or a property of the class or a property of a sub-class of the class that includes some but not all of the instances in the class.

In this description, references to "a/an/the" [feature, element, component, means . . . ] are to be interpreted as "at least one" [feature, element, component, means . . . ] unless explicitly stated otherwise.

The above description describes some examples of the present disclosure however those of ordinary skill in the art will be aware of possible alternative structures and method features which offer equivalent functionality to the specific examples of such structures and features described herein above and which for the sake of brevity and clarity have been omitted from the above description. Nonetheless, the above description should be read as implicitly including reference to such alternative structures and method features which provide equivalent functionality unless such alternative structures or method features are explicitly excluded in the above description of the examples of the present disclosure.

As an example, the apparatus described may be used for detecting pulsar radiation (e.g. by detecting neutron pulses) which may be part of a space craft navigation or positioning system.

Whilst endeavouring in the foregoing specification to draw attention to those features of examples of the present disclosure believed to be of particular importance it should be understood that the applicant claims protection in respect of any patentable feature or combination of features hereinbefore referred to and/or shown in the drawings whether or not particular emphasis has been placed thereon.

The invention claimed is:

1. An apparatus comprising:
a first layer comprising a plurality of sensors comprising parallel and separate elongate strips of material, wherein each of the plurality of sensors comprises graphene and is configured to be responsive to changes in an electric field in a vicinity of the corresponding sensor;
a second layer comprising a substrate configured to produce one or more charge carriers in response to incident radiation; and
a third layer comprising a plurality of parallel and separate elongate electrodes that are perpendicular with respect to the plurality of sensors, wherein the strips of material for the plurality of sensors extend over multiple ones of the elongate electrodes and the elongate electrodes extend beneath multiple ones of the strips of material for the plurality of sensors, wherein the plurality of electrodes are configured to be selectively addressed during a readout operation of the plurality of sensors,
wherein the second layer is disposed between the first layer and the third layer.

2. The apparatus of claim 1, further comprising circuitry configured to monitor one or more parameters of one or more responses of each of the plurality of sensors to changes in the electric field while each of the plurality of electrodes is selectively addressed.

3. The apparatus of claim 1, wherein each of the plurality of sensors comprises: a first electrode, a second electrode and a material provided between the first and second electrodes, wherein the material is configured to be sensitive to electric fields.

4. The apparatus of claim 1, wherein each of the plurality of sensors is configured to extend in a first direction; and wherein each of the plurality of electrodes extend in a second direction substantially perpendicular to the first direction.

5. The apparatus of claim 1, further comprising circuitry configured to measure one or more responses of each of the plurality of sensors, and wherein the circuitry is further configured to:
    identify one or more of the plurality of sensors in dependence upon the measured one or more responses.

6. The apparatus of claim 1, further comprising a fourth layer disposed over the first layer, wherein the fourth layer comprises a further electrode.

7. The apparatus of claim 1, wherein the substrate comprises boron nitride.

8. The apparatus of claim 2, wherein the circuitry is configured to:
    control the readout operation of each of the plurality of sensors, and
    selectively address each of the plurality of electrodes by sequentially applying an input to each of the plurality of electrodes;
    wherein the control circuitry is configured to measure one or more responses of each of the plurality of sensors upon the application of the input to each of the plurality of electrodes.

9. The apparatus of claim 2, further comprising control circuitry configured to:
    identify one or more of the plurality of electrodes in dependence upon the one or more responses of each of the plurality of sensors.

10. The apparatus of claim 9, wherein the control circuitry is further configured to determine one or more positions on the apparatus depending on the identified one or more of the plurality of electrodes.

11. The apparatus of claim 3, wherein:
    the material and the first and second electrodes are configured to form at least a part of a field effect transistor,
    the first and second electrodes are configured to provide source and drain electrodes, and/or
    the plurality of electrodes are configured to provide a plurality of gate electrodes.

12. The apparatus of claim 5, wherein the circuitry is further configured to determine one or more transverse positions along the apparatus depending on the identified one or more of the plurality of sensors.

13. The apparatus of claim 5, wherein the circuitry is further configured to determine one or more locations of radiation incident to the apparatus depending at least partly on the identified one or more of the plurality of sensors so as to provide position sensitive detection of incident radiation in at least a transverse direction of the apparatus.

14. The apparatus of claim 6, further comprising control circuitry configured to provide a voltage to the further electrode for increasing a drift velocity of charge carriers in the substrate.

15. The apparatus of claim 6, further comprising control circuitry configured to provide a voltage to the further electrode for neutralising any trapped charges.

16. A device or module configured to detect radiation comprising:
    an apparatus comprising:
    a first layer comprising a plurality of sensors comprising parallel and separate elongate strips of material, wherein each of the plurality of sensors comprises graphene and is configured to be responsive to changes in an electric field in a vicinity of the corresponding sensor;
    a second layer comprising a substrate configured to produce one or more charge carriers in response to incident radiation; and
    a third layer comprising a plurality of parallel and separate electrodes that are perpendicular with respect to the plurality of sensors, wherein the strips of material for the plurality of sensors extend over multiple ones of the elongate electrodes and the elongate electrodes extend beneath multiple ones of the strips of material for the plurality of sensors, wherein the plurality of electrodes are configured to be selectively addressed during a readout operation of the plurality of sensors,
    wherein the second layer is disposed between the first layer and the third layer.

17. An ionizing radiation imaging device comprising:
    an apparatus comprising:
    a first layer comprising a plurality of sensors comprising parallel and separate elongate strips of material, wherein each of the plurality of sensors comprises graphene and is configured to be responsive to changes in an electric field in a vicinity of the corresponding sensor;
    a second layer disposed between the first layer and a third layer and comprising a substrate configured to produce one or more charge carriers in response to incident radiation;
    the third layer comprising a plurality of parallel and separate electrodes that are perpendicular with respect to the plurality of sensors, wherein the strips of material for the plurality of sensors extend over multiple ones of the elongate electrodes and the elongate electrodes extend beneath multiple ones of the strips of material for the plurality of sensors, wherein the plurality of electrodes are configured to be selectively addressed during a readout operation of the plurality of sensors,
    wherein the apparatus further comprises one of the following:
        a fourth layer disposed over the first layer, wherein the fourth layer comprises a dielectric, and a fifth layer disposed over the fourth layer, wherein the fifth layer comprises an electrode disposed in an area over the plurality of sensors; or
        the fourth layer disposed over the third layer, wherein the fourth layer comprises the dielectric, and the fifth layer disposed over the fourth layer, wherein the fifth layer comprises an electrode disposed over the plurality of parallel and separate electrodes that are perpendicular with respect to the plurality of sensors.

18. The apparatus of claim 10, wherein the control circuitry is further configured to determine one or more locations of radiation incident to the apparatus depending at least partly on at least the identified one or more of the plurality of electrodes.

19. The ionizing radiation imaging device of claim 17, wherein:
    the ionizing radiation imaging device further comprises control circuitry that is configured to provide one of:
        a first voltage having a polarity to the electrode in the fifth layer, when the fourth layer is disposed over the first layer, in order to provide a potential difference between the electrode in the fifth layer and the plurality of the electrodes in the third layer; or
        a second voltage to the electrode in the fifth layer, when the fourth layer disposed over the third layer, in order to provide a potential difference between the electrode in the fifth layer and the plurality of the electrodes in the third layer, the second voltage opposite in polarity to the polarity of the first voltage;

the control circuitry is configured to cause one or more readout operations to detect an incident radiation detection event using one or more of the plurality of sensors in response to the voltage being provided.

20. The ionizing radiation imaging device of claim 17, further comprising control circuitry configured to apply a voltage electric pulse to the electrode in the fifth layer, the voltage electric pulse configured to neutralise trapped charges and make the ionizing radiation imaging device ready for a next incident radiation detection event.

21. The ionizing radiation imaging device of claim 17, wherein the substrate comprises boron nitride.

* * * * *